United States Patent
Figge et al.

[11] Patent Number: 5,904,086
[45] Date of Patent: May 18, 1999

[54] APPARATUS FOR CUTTING A HIGH-SPEED STRIP

[75] Inventors: Dieter Figge, Essen; Karl-Heinz Wessel, Dinslaken, both of Germany

[73] Assignee: Mannesmann Aktiengesellschaft, Düsseldorf, Germany

[21] Appl. No.: 08/739,175

[22] Filed: Oct. 30, 1996

[30]     Foreign Application Priority Data

Oct. 31, 1995 [DE]   Germany ............................ 195 42 173

[51] Int. Cl.⁶ ...................................................... B26D 1/62
[52] U.S. Cl. ....................... 83/698.61; 83/674; 83/698.51
[58] Field of Search ............................ 83/698.51, 698.61, 83/674, 343, 345, 346, 563

[56]             References Cited

U.S. PATENT DOCUMENTS

| | | | |
|---|---|---|---|
| 2,445,174 | 7/1948 | Hannewald et al. ....................... | 164/66 |
| 2,660,242 | 11/1953 | Lane .......................................... | 83/674 |
| 3,174,428 | 3/1965 | Huck ..................................... | 83/345 X |
| 3,340,757 | 9/1967 | Rudszinat ................................ | 83/343 |
| 3,477,328 | 11/1969 | Schonmeier et al. ............. | 83/698.61 X |
| 4,276,797 | 7/1981 | Baumann et al. ..................... | 83/346 X |
| 4,485,710 | 12/1984 | Schlisio et al. .................. | 83/698.51 X |
| 4,860,623 | 8/1989 | Pawelko ..................................... | 83/346 |
| 4,984,491 | 1/1991 | Bragaglia .......................... | 83/698.61 X |
| 5,222,422 | 6/1993 | Benner, Jr. et al. ................... | 83/345 X |
| 5,367,936 | 11/1994 | Held et al. ........................ | 83/698.51 X |
| 5,465,641 | 11/1995 | Herd ...................................... | 83/698.61 |

FOREIGN PATENT DOCUMENTS 1281794  1/1965  Germany .

*Primary Examiner*—M. Rachuba
*Assistant Examiner*—Charles Goodman
*Attorney, Agent, or Firm*—Cohen, Pontani, Lieberman & Pavane

[57]             ABSTRACT

A drum-type shear for cutting high-speed strip, especially hot strip, includes a blade that is movable radially into and out of a rotating blade drum from which it is extendable into a strip-cutting position at a desired cutting time. In order to provide reliable and accurate cross-cutting of even broad and thick strips using nevertheless simple structural means, a linearly translatable push-pull rod that extends axially in the blade drum has wedge surfaces that abut with corresponding wedge surfaces of the blade or blade holder for extending and retracting the cutting blade. The push-pull rod rotates with the blade drum and is connected to a stationary linear drive via a thrust bearing for transmitting axial rod-translating forces to the push-pull rod as the rod rotates with the drum.

4 Claims, 5 Drawing Sheets

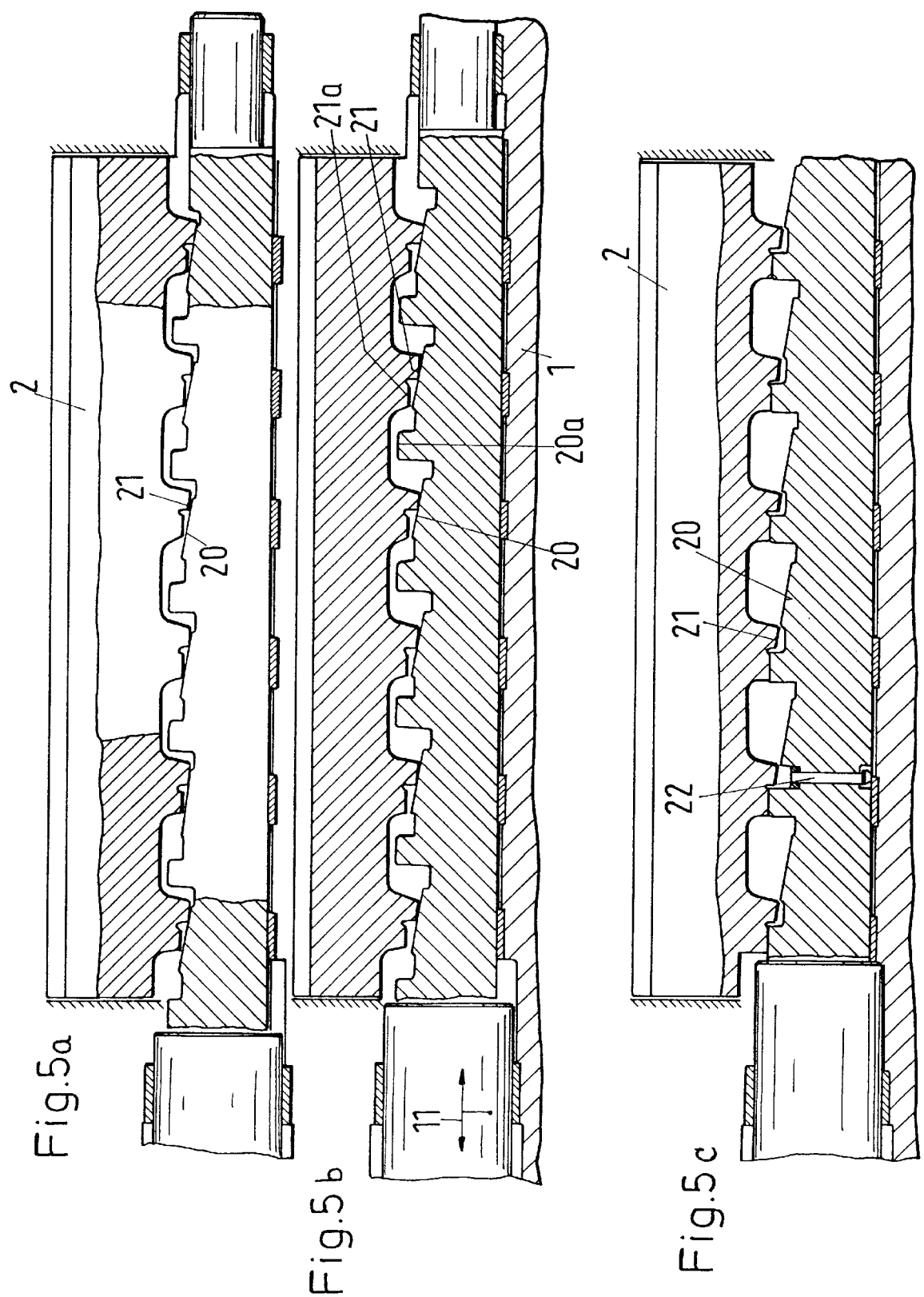

APPARATUS FOR CUTTING A HIGH-SPEED STRIP

BACKGROUND OF THE INVENTION

1. Field of the Invention

The present invention relates to drum-type shears for cutting high-speed strip, especially hot strip slabs, and more particularly to a drum-type shear having a blade that is carried in a rotatable blade drum and is selectively movable out of the blade drum and into a cutting position at a desired cutting time.

2. Description of the Related Art

Drum-type shears which can be used to crop and divide strip material, especially hot strip slabs, are known. Such shears operate as high-speed shears, i.e. the drums accelerate from a standing start to rotate at the passage speed of the rolled strip or slab material in approximately 0.9 drum rotations, cut the rolled material and then decelerate. At strip bandwidths of greater than about 1300 mm and strip speeds of approximately 3 m/sec, a limit is reached above which the enormous energy required for driving these shears can no longer be generated. In order to accelerate and decelerate the flywheel moments of the rotating masses, approximately 2000 kw of power must be provided in a short time period. When secondarily controlled hydraulic motors are used, the corresponding pump capacity for this power must also be made available. Even if a cut occurs only once every 10 minutes and acceleration/deceleration is needed then for only 0.5 seconds each time, the expense of the additional equipment required to accelerate and decelerate the cutting shears is extremely large.

As a rule, high-speed shears are adequate for conventional production processing of single slabs of material with rolled material speeds of up to about 3 m/sec, because it is not necessary to cut at the coiling speed when rolling out single slabs.

In various new production processes, however, the operations of strip casting and forming are linked, so that strip is produced and cut in a continuous series of process steps. As a consequence, slabs weighing 20 tons are no longer rolled individually into coils, as was done in the past. Instead, an almost continuous strand is produced, formed and cross-cut in front of the coiling device. Strip speeds of 4 to 10 m/sec and above are thereby achieved, requiring corresponding outputs from the shears located in front or upstream of the coiler.

So-called two-drum shears for cutting high-speed rolled material are well known as such. In two-drum shears, the rolled material to be cut passes between two separate blade drums which rotate at a peripheral speed corresponding to the passage speed of the rolled material. The blades or blade holders holding the blades are mounted in the blade drums in a radially movable fashion and are moved radially outward from the drum for cutting of the material. Unlike the aforementioned high-speed shears, two-drum shears do not need to be accelerated in a very short time to the passage speed of the rolled material; rather, the blade drums can be initially brought up to speed and then maintained at an undisturbed high speed, after which the blades may be used to cut the material at the desired time.

When the passage speed of the rolled material is extremely high, it has also been proposed—as in DE-AS 12 81 794—to advance the blades from within the two-drum shears into the cutting position by means of a shock or pressure-wave piston.

The primary problems with known two-drum shears for cutting of high-speed rolled material are related to the mechanical guidance of the blades or blade holders and to the hydraulic action of the pistons that activate the blades. Often, the mechanical system and hydraulic system are not able to absorb the high cutting forces of 110 to 300 tons that typically occur during cutting, especially in the case of thicker rolled material, so that the use of two-drum shears is limited to thinner rolled material or narrow strips or wire.

There is accordingly a need for a high-speed drum-type shear that can crop and divide strip material at strip speeds of 10 m/sec and above. There is also a need for a high-speed drum-type shear that can accelerate and decelerate at speeds corresponding to the strip speed without requiring additional and expensive equipment. There is further a need for a high-speed drum-type shear having a mechanical system for deploying the cutting blade and that is capable of withstanding cutting forces of up to 300 tons.

SUMMARY OF THE INVENTION

It is accordingly an object of the present invention to provide an improved drum-type shear for cutting of high-speed strip material in such a way that reliable and accurate cross-cutting, even of broader and thicker strips, is readily attainable using relatively simple structural means.

To attain this object, and in accordance with the present invention, an axial push-pull rod is provided in the blade drum for moving the blades into and out of cutting position. The push-pull rod has a wedge-shaped surface which rests on corresponding wedge-shaped surfaces of the blade or the blade carrier or holder. By linearly moving the push-pull rod axially into the blade drum, the blade can be selectively deployed from a non-cutting to a cutting position. Wedges disposed within the blade drum cooperate with springs, also located within the blade drum, to correspondingly force the blade to retract from its cutting to its non-cutting position as the push-pull rod is linearly withdrawn from the blade drum. In addition, the push-pull rod rotates with the blade drum and is connected to a stationary linear drive by a thrust bearing through which axial forces are transmitted to the push-pull rod.

The wedge surfaces on the push-pull rod and on the blade or blade carrier that move the blade into and out of cutting position can transmit and support cutting forces of up to about 300 tons in a reliable and mechanically simple way. The wedge surfaces are easily produced by using surface machining devices, and the guides are reliable and low-maintenance. The entire drive of the invention is economical to manufacture and subject to very little wear.

In a particular embodiment of the present invention, the push-pull rod is box-like or rectangular in cross-section and has a lid section, an inner bottom section and a penetration gap located in the interior of the push-pull rod for accepting the blade. The push-pull rod is linearly movable in a first direction for moving the blade or blade holder into the cutting position. The push-pull rod is further linearly movable in a second or opposite direction for moving the blade or blade holder back into the non-cutting position, i.e. to retract the blade from the cutting position. Both the lid section and the inner bottom section include wedge surfaces that face or oppose one another and rise in the direction of operational movement of the push-pull rod, i.e. the slope of the wedge surface included on the lid section of the push-pull rod rises as the push-pull rod moves in the second direction for retracting the blade or blade holder from the cutting position and slope of the wedge surface included on the inner bottom section of the push-pull rod rises as the push-pull rod moves in the first direction for advancing the blade or blade holder into the cutting position.

In a preferred embodiment, the blade or blade holder includes a lateral projection extending from a bottom portion which includes a wedge-shaped surface that confrontingly faces or opposes the wedge-shaped surface provided on the lid section of the push-pull rod. The blade or blade holder further comprises a bottom surface which includes a wedge-shaped surface that confrontingly faces or abuttingly opposes the wedge-shaped surface defined on the inner bottom section of the push-pull rod. The wedge-shaped surface on the lateral projection has the same slope as the wedge surface on the inner bottom section of the push-pull rod. The wedge-shaped surface on the lid section has the same slope as the wedge surface on the bottom of the blade.

The present invention may prove especially advantageous when, in accordance with another feature of the invention, the blade drum recess is substantially U-shaped and the box-like or rectangular (in cross-section) push-pull rod is slidable axially within the blade drum recess along axial guides defined in the recess and relative to the radially adjustable blade.

In order to transfer the required high cutting forces, the wedges or wedge-shaped surfaces of the present invention offer a resistance moment sufficient to transmit these forces to the shear stands via the thrust bearings. In a particularly preferred embodiment, facing or confrontingly opposite horizontal surface portions or sections are included as part of the wedges or wedge-shaped surfaces on the blade or blade holder and push-pull rod. Advantageously, the wedges or wedge-shaped surfaces are used to advance and retract the blade move only before and after the cut, i.e. when the blade is not cutting the high-speed strip material. When the blade is cutting the high-speed strip material, the opposed substantially horizontal surface portions on the blade or blade holder and push-pull rod are driven into abutment to substantially carry and support the blade. As a result, the high cutting forces are not transmitted to the wedges or wedge-shaped surfaces and to the drive devices associated therewith. Thus the wedge-shaped surfaces are not in contact during cutting (i.e. they contact only before and after cutting) and the very high cutting forces required for cutting the high-speed strip material are not transmitted to the wedge-shaped surfaces. If the horizontal surface portions were not included on the bottom surface of the blade or blade holder and on the inner bottom section of the push-pull rod, the cutting forces, reaching 300 tons in some cases, would be transmitted directly onto the wedge-shaped surfaces and thereby encourage retraction of the blade towards its non-cutting position during cutting.

In a particularly advantageous embodiment of the present invention, the stationary linear drive comprises a hydraulic cylinder. A powerful hydraulic cylinder of this sort can easily move the wedge in the short time required so that the blade can be moved radially out of the blade drum for cutting on demand. In other words, the cutting blade can be selectively moved out of and into the blade drum during each rotation of the blade drum to effectively deploy the cutting blade only when cutting the web.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views:

FIGS. 5A–5C are cross-sectional views of the push-pull rod of the blade drum of FIG. 3 in three distinct adjustment positions.

DETAILED DESCRIPTION OF THE PRESENTLY PREFERRED EMBODIMENTS

The present invention provides a novel and unobvious apparatus for controlling the position of a cutting blade carried in a blade drum. Complementary engaging surfaces are provided on the cutting blade and on a push-pull rod to cause the blade to be deployed in a cutting and a non-cutting position. In a first embodiment, the push-pull rod is substantially wedge-shaped and the cutting blade includes complementary wedge-shaped surfaces. The push-pull rod is axially movable into and out of the blade drum and when so moved, causes the cutting blade to move between its cutting and non-cutting positions. Lateral projections provided on the cutting blade interfere with upper wedges provided within the blade drum to secure the blade therein. A plurality of compression springs provided within the upper wedges act upon the lateral projections to bias the wedge-shaped surface of the cutting blade into contact with the lower wedge. The springs thus 1) ensure that the complementary wedge-shaped surfaces remain in contact with each other and 2) provide a biasing force upon the cutting blade to cause the cutting blade to move from its cutting to its non-cutting position as the push-pull rod is moved axially out of the blade drum. In an alternative embodiment, the push-pull rod is substantially rectangularly shaped when viewed in cross-section. Two pair of wedge-shaped surfaces are provided on the push-pull rod and cutting blade: one for causing the cutting blade to move to its cutting position and the other for causing the cutting blade to move to its non-cutting position. The push-pull rod and cutting blade wedge-shaped surfaces are configured so that when the push-pull rod is axially moved into the blade drum, a first pair of wedge-shaped surfaces contactingly interact with each other and cause the blade to be deployed for cutting while the other pair remains in spaced apart relation to each other. Conversely, when the push-pull rod is axially drawn out of the blade drum, the other pair of wedge-shaped surfaces contactingly interact with each other and cause the blade to retract while the first pair remains in spaced apart relation to each other. Thus, the first pair of wedge-shaped surfaces causes the cutting blade to move out of the blade drum and the other pair causes the cutting blade to move into the blade drum. Complementary and substantially horizontal surfaces provided on the push-pull rod and cutting blade contactingly engage each other when the cutting blade is in the cutting position and none of the wedge-shaped surfaces contact each other when the cutting blade is so disposed. Accordingly, the cutting forces are absorbed by the horizontal surfaces thereby securing the blade in the cutting position.

Figure 1:
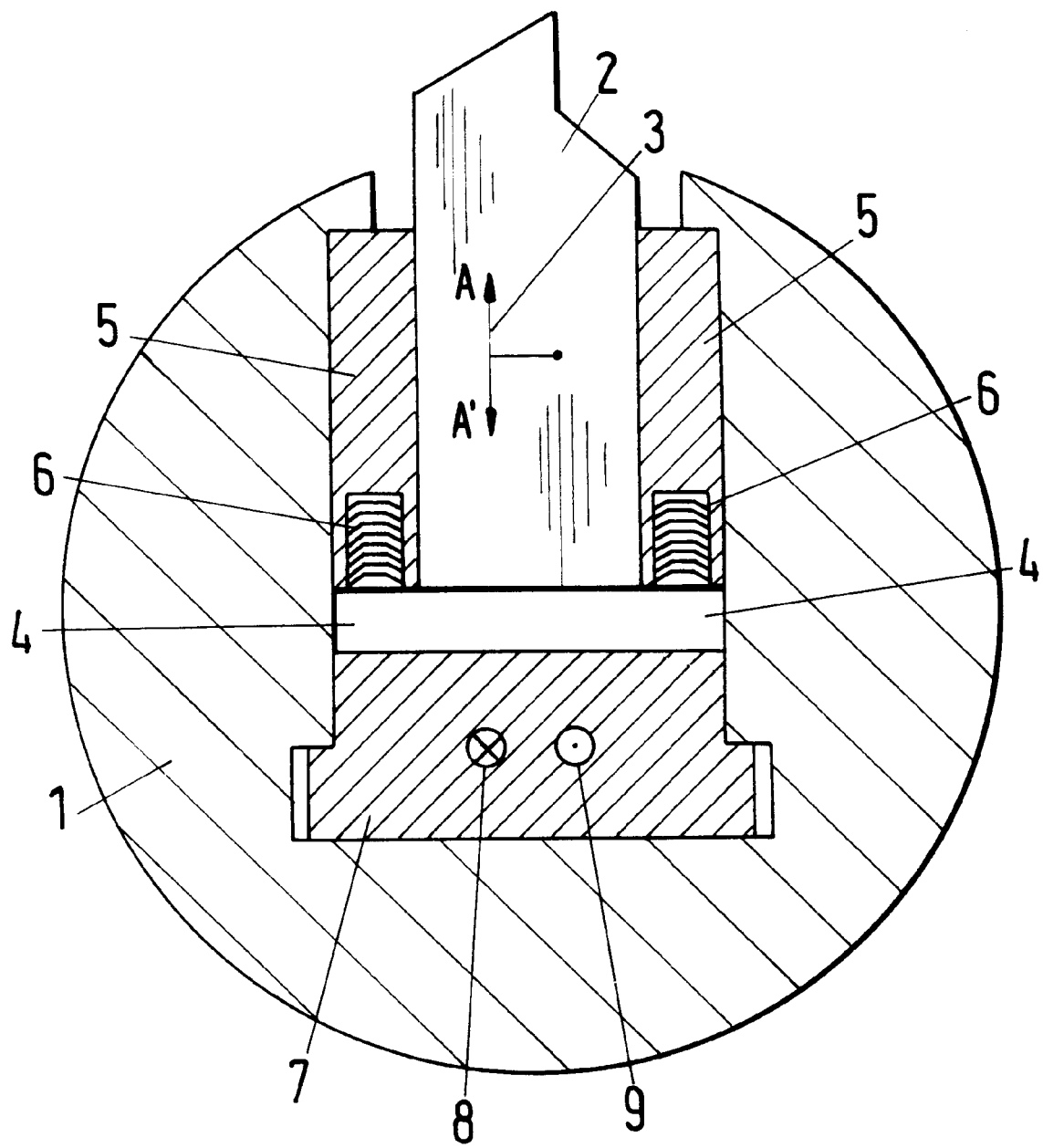
FIG. 1 is a cross-sectional view of a blade drum of a drum-type shear constructed in accordance with the present invention.

Referring now to the drawings, FIG. 1 depicts a cross-sectional view through the blade drum 1 of a drum-type shear device constructed in accordance with a first embodiment of the present invention. The blade 2 is movable or extendible radially outwardly from the drum 1 in the direction of arrow A and inwardly retractable to thereafter return the blade to its initial position in the drum in the direction of arrow A' by means of a push-pull rod 3. Confrontingly opposed and abutting upper and lower wedges 5, 7 are carried or defined in the blade drum 1 and on the push-pull rod 3, respectively. The lower wedge 7 is movable into and out of the blade drum 1 in the direction indicated by arrows B and B' (FIG. 2) and as indicated at 8 and 9 while the upper wedge 5 remains generally fixed in place within the blade drum 1. The lower area of the blade 2 includes lateral projections 4 which are generally sandwiched between the upper and lower wedges 5, 7 and serve to secure the blade 2 within the blade drum 1. To compensate for the centrifugal forces of the blade 2 during rotation of the blade drum 1, and to ensure that the blade 2 contacts the lower wedge 7 compression plate springs 6 press the blade 2 via the lateral projections 4 along a generally material plane (in the drawing) against the lower wedge 7. Movement of the lower wedge 7 in the direction of arrow B (FIG. 2) causes the blade 2 to move in the direction of arrow A toward the outside or periphery of drum 1, i.e. to its cutting position. Movement of lower wedge 7 in the opposite direction (of arrow B in FIG. 2), in cooperation with the upper lateral projections 4 wedges 5, correspondingly causes the blade 2 to move in the direction of arrow A' back into the drum recess to its non-cutting position.

Figure 2:
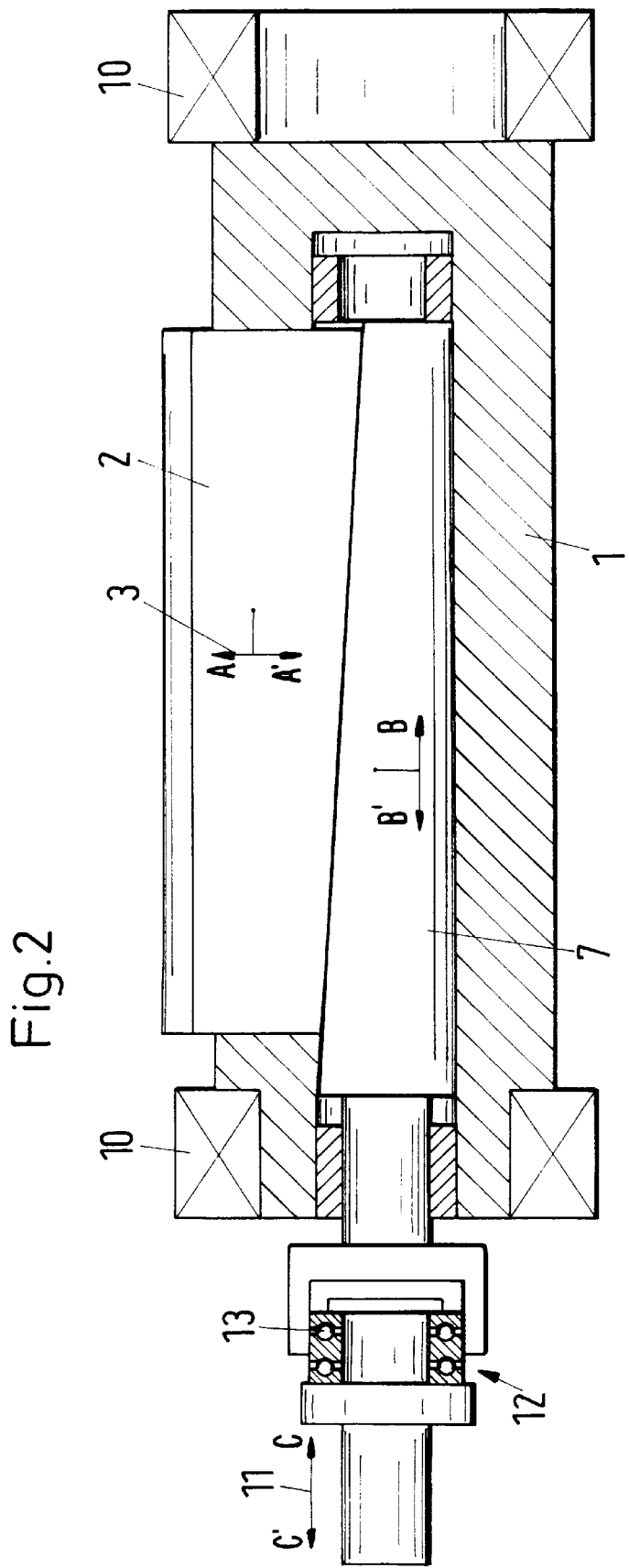
FIG. 2 is a longitudinal cross-sectional view of the blade drum of FIG. 1.

FIG. 2 shows a longitudinal cross-section through the blade drum 1 of FIG. 1. The blade drum 1 is rotatably mounted in bearings 10 which are typically supported by shear stands (not shown). As described above, the cutting edge of the blade 2 is operatively movable into and out of the blade drum 1 in the directions indicated by the arrows A, A' through linear movement of the push-pull rod 3 and the lower wedge 7 in the axial directions of the arrows B, B'. This linear movement is achieved through forces provided by a stationary linear drive 11, which may for example be implemented as a hydraulic cylinder, the movement of which is indicated by the arrows C, C'. The linear drive 11 is connected to axial ball bearings 13 via a thrust bearing 12 which transmits therethrough the axial forces from the linear drive 11. The lower wedge 7 is thus axially movable (as indicated by the arrows C, C') via the linear drive 11 without hindering rotational movement of the blade drum 1 which carries the blade 2 and lower wedge 7.

Figure 3:
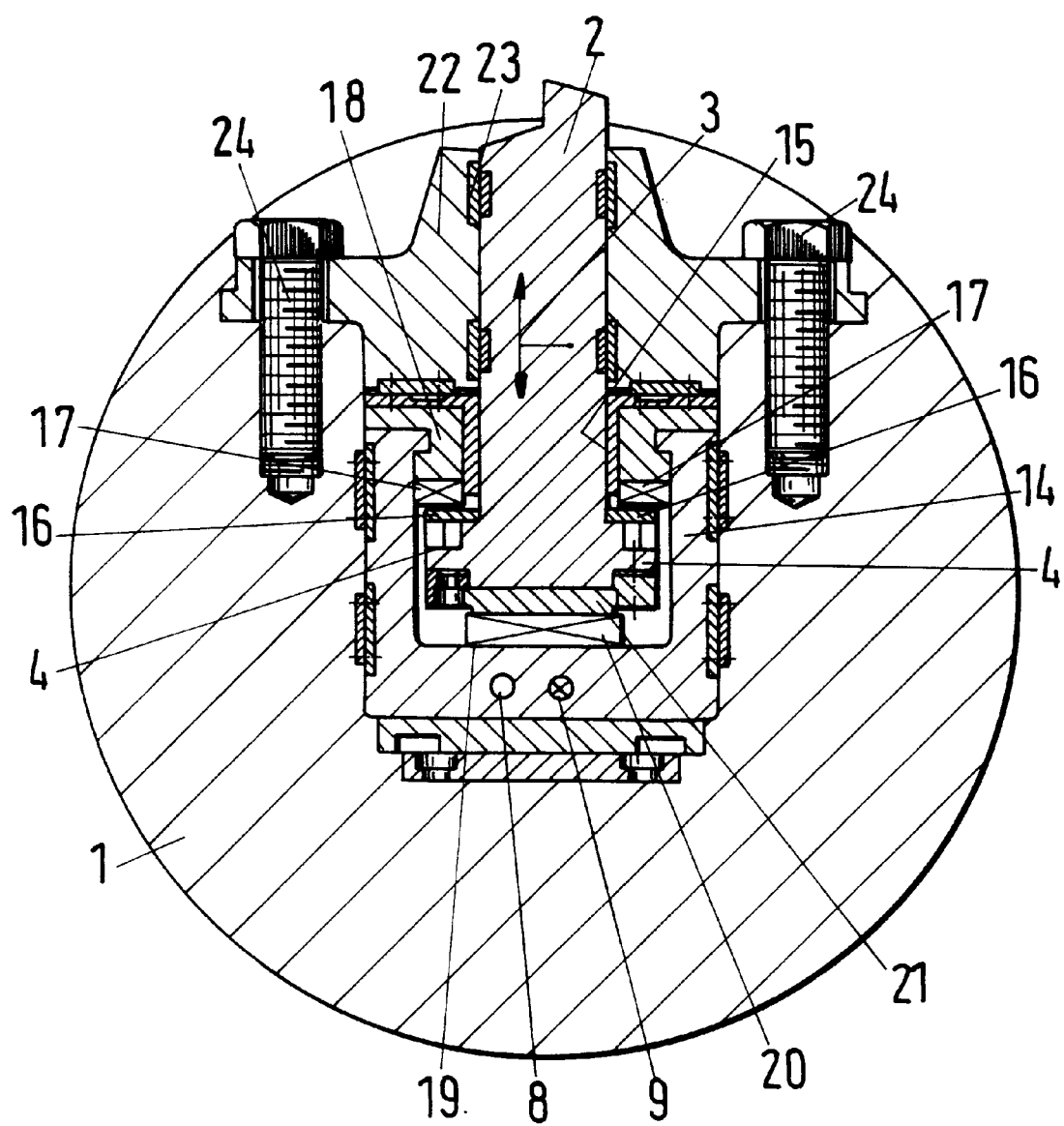
FIG. 3 is a cross-sectional view of an alternative embodiment of a blade drum constructed in accordance with the present invention including a cross-sectionally rectangular or box-like push-pull rod.

FIG. 3 depicts an alternative embodiment of the inventive apparatus having a cross-sectionally box-like or generally rectangular push-pull rod 3 that is movable in a substantially U-shaped recess defined axially in and along the blade drum 1. An inner lid section 18 of the push-pull rod 3 has a penetration gap 15 for accepting the blade 2. A side of the lateral projection 4 of the blade 2 includes wedges 16 provided thereon facing the inner lid section 18, that correspond to similar wedges 17 provided on inner lid section 18 of the push-pull rod 3. The wedges 16, 17 are configured so as to forcibly cause the blade 2 to move from its outward or strip-cutting position to its interior resting or non-cutting position when the push-pull rod 3 is moved in the direction of arrow B in FIG. 2. Push-pull rod 3 has an inner bottom section 19 having a wedge surface 20 provided thereon that is confrontingly opposed to and abuts a corresponding wedge surface 21 defined on the bottom surface (opposite or remote from the cutting edge) of the blade 2. The confrontingly opposed wedges 20, 21 serve, as one moves relative to the other, to forcibly cause the blade 2 to move from its resting or non-cutting position to its outward or strip-cutting position. That is, axially moving the box-like push-pull rod 3 in the movement directions indicated by the arrows B', B (FIG. 2) causes the blade 2 to move radially outward or inward in the directions of the arrows A, A' via the opposed wedge surfaces 20, 21 and 16, 17, respectively.

Figure 4:
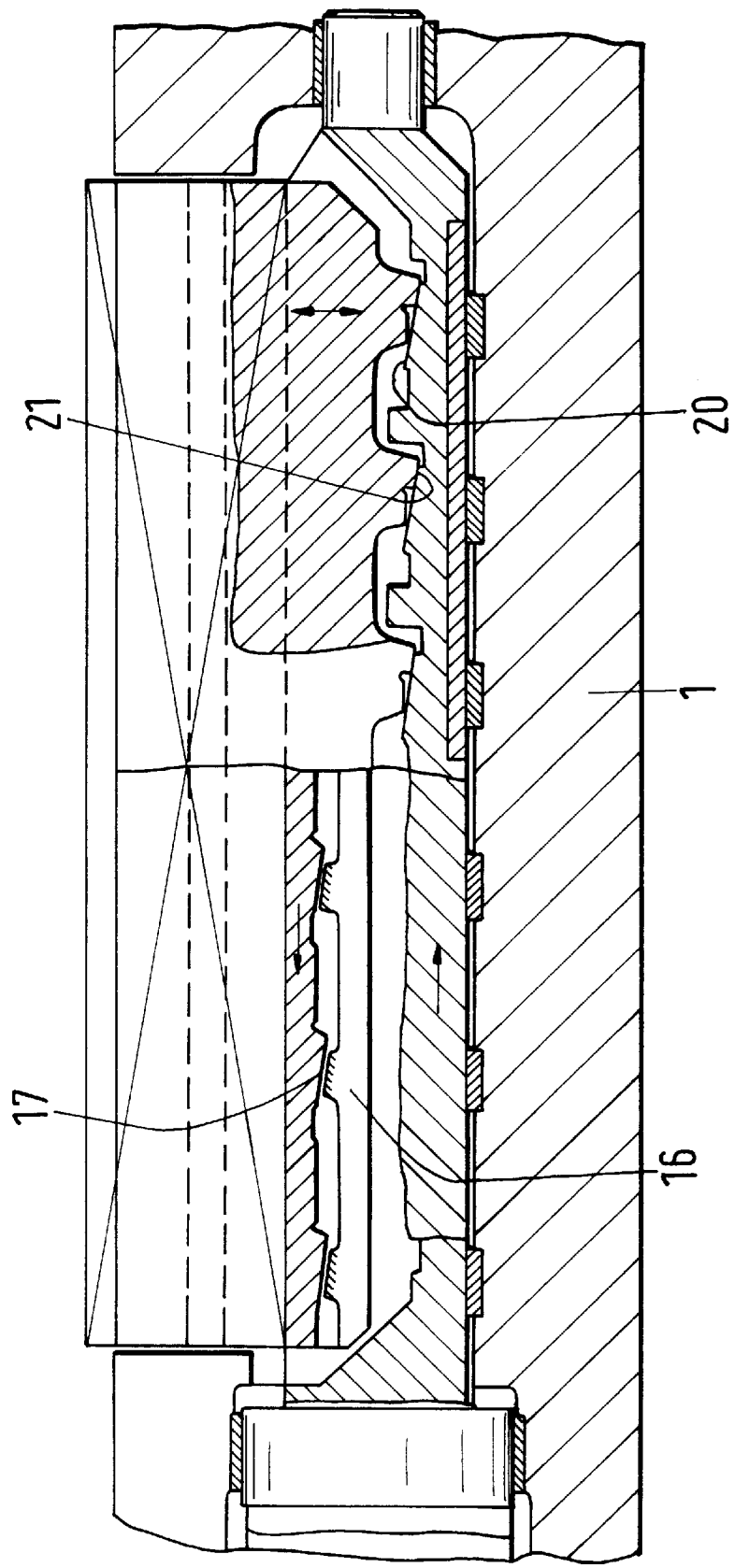
FIG. 4 is a longitudinal cross-sectional view of the blade drum of FIG. 3 illustrating the wedge-shaped surfaces of the push-pull rod and blade or blade holder.

Referring to FIGS. 3 and 4, wedge surfaces 16 and 21 are part of the blade 2 and are horizontally stationary in FIG. 4. On the other hand, wedge surfaces 17 and 20 are part of the push-pull rod 3 and therefore both move horizontally with the push-pull rod 3 when the push-pull rod 3 is moved horizontally. Referring specifically to FIG. 4, when the push-pull rod 3 is moved to the right, wedge surfaces 17 and 20 both move to the right and wedge surfaces 20 act on wedge surfaces 21 push the blade 2 to its outward position. When the push-pull rod 3 is moved to the left, the wedge surfaces 17 and 20 both move to the left and wedge surfaces 17 now act on the wedge surfaces 16 to push the blade 2 back toward its interior position. As depicted in FIG. 5B, wedge surface 20 provided on the inner bottom section 19 of the push-pull rod 3, and wedge surface 21 on the bottom surface of the blade 2, also include opposed and substantially horizontal surface portions or sections 20a and 21a, respectively. Horizontal sections 20a, 21a face or oppose one another and are located so that the horizontal surface 21a of the blade 2 or blade holder rests supportedly on the horizontal surface 20a of the inner bottom section 19 of the push-pull rod 3 when the blade 2 is fully deployed in its cutting position for cutting high-speed strip material (see e.g. FIG. 5C). This ensures that the sloping wedge-shaped surfaces 20, 21 are not directly in contact during cutting (i.e. they contact only before and after cutting) so that the very high cutting forces required and applied for cutting the high-speed strip material are not transmitted to or between the sloping wedge-shaped surfaces 20, 21. Without the horizontal sections 20a, 21a on the bottom surface of the blade 2 or blade holder and the inner bottom section 19 of the push-pull rod 3, cutting forces transmitted directly onto the sloping wedge-shaped surfaces 20, 21 could cause or encourage relative axial sliding movement of the blade 2 and push-pull rod 3 and, thereby, retraction of the blade 2 towards its non-cutting position.

For ease of assembly and to radially guide the blade 2, the drum 1 carries a guide lid 22 that is provided on its inner side with sliding guides 23 for the blade 2 and is secured laterally to the blade drum 1 by screws or fasteners 24.

FIG. 4, a longitudinal cross-section through the blade drum assembly of FIG. 3, illustrates the manner in which the inventive device operatively functions. For a given placement of an intended cut through high-speed strip material, the left half of the drawing shows the relative relationship of the wedge surfaces 16, 17 when the blade 2 is advanced and in the cutting position. The wedge surfaces 16, 17 are positioned for withdrawing or retracting the blade into the drum 1 and do not contact each other when the blade 2 is in the cutting position. The right half of the drawing in FIG. 4 shows the relative non-contacting position of the wedge surfaces 20, 21 when the blade is retracted and in the non-cutting position. The wedge surfaces 20, 21 are positioned for advancing the blade out of the drum.

FIGS. 5A–5C illustrate the preferred configuration and contour of the wedge surfaces 20, 21, including the and horizontal surface portions or sections 20a, 21a for absorbing the cutting forces. Three positions are shown in these figures—the non-cutting position (FIG. 5A), an intermediate position (FIG. 5B) and the cutting position (FIG. 5C) of the blade, each indicating the positions of the relatively moved wedge surfaces 20, 21 and the horizontal surface portions or sections 20a, 21a. In FIG. 5A, push-pull rod 3 is located at its left-most (in the drawing) or resting position, i.e. with the blade 2 in the retracted or non-cutting position. When moving the blade 2 from its resting to its cutting position, the wedge surfaces 20, 21 carry the blade 2 and press it toward the outside or circumferential periphery of the drum 1, i.e. in the direction of arrow A in FIG. 3. Moving the push-pull rod 3 to the right in the drawing from its FIG. 5A to its FIG. 5C position causes the wedge surface 20 to apply an upward (in the drawings) or radially outward force against the corresponding wedge surface 21 on the blade 2 or blade carrier, thus forcibly displacing the blade 2 radially out of and beyond the periphery of the blade drum 1 and into the cutting position. The blade 2 is initially moved or advanced radially out of the blade drum 1 by approximately one millimeter more than is necessary for its support during the cutting operation described below, thereby permitting the horizontal surface portions 20a, 21a to be properly aligned with each other prior to contact of the blade 2 with the high-speed strip material and of the horizontal surface portions 20a, 21a with each other.

In the final or cutting position shown in FIG. 5C, the axially displaced push-pull rod 3 is disposed at its linearly rightmost (in the drawing) position and, as a cut is made, the blade 2 encounters a cutting force as it contacts the material to be cut that displaces the blade 2 back into the blade drum 1 a distance of approximately one millimeter until the opposed horizontal surface portions 20a and 21a, which are positioned one confrontingly opposite the other, are driven into abutment to substantially carry and support the blade 2. As a result, the sloping wedge surfaces 20, 21 are kept free from these cutting forces and no reaction forces from the cutting action of the blade 2 are transmitted linearly along the longitudinal elongational push-pull rod 3 to the drive devices and structure associated therewith, i.e. the cutting forces are directed substantially transverse to the push-pull rod 3 longitudinal axis.

When the blade 2 is in its cutting position, the sloping wedge surfaces 16, 17 (FIG. 4) and 20, 21 (FIG. 5C) do not contact one another. As soon as the cutting pressure on the blade 2 is removed or otherwise ceases, the centrifugal force of the rotating drum 1 displaces the blade 2 radially outward by approximately 1 millimeter. In addition, a bolt 28 (FIG. 5C) is directed in a direction substantially transverse to the push-pull rod 3 longitudinal axis and presses on the sloping wedge-shaped surface 21 of the blade 2 to thereby prevent the wedge-shaped surfaces 16, 17 from contacting one another. As the push-pull rod 3 is then withdrawn or moved axially in the direction of arrow B' (FIG. 2), the bolt 28 is withdrawn and wedge-shaped surface 17 engagingly contacts wedge-shaped surface 16 and overcomes the centrifugal force to force the blade 2 to withdraw or retract from its cutting to its non-cutting position.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. An apparatus for cutting a high speed strip, comprising:
    a blade drum operatively rotatable about a blade drum axis and having a recess defined in said drum;
    a cutting blade having a cutting edge and a first wedge-shaped surface and being disposed for movement between a first non-cutting position substantially within said blade drum recess and a second cutting position in which said cutting edge projects radially outward from said blade drum recess;
    a linearly movable push-pull rod having a substantially rectangular cross-section disposed in said blade drum recess for linear movement axially along and within said blade drum, and having a second wedge-shaped surface disposed in confrontingly engaging opposition to said cutting blade first wedge-shaped surface for cooperatively moving said cutting blade as said push-pull rod is linearly moved; and
    a thrust bearing connected to said push-pull rod for transmitting to said push-pull rod, through said thrust bearing, linear forces for linearly moving said push-pull rod axially along and within said blade drum as said blade drum operatively rotates so as to selectively move said cutting blade between said first non-cutting position and said second cutting position;
    a lateral projection formed on said cutting blade for securing said cutting blade in said blade drum, said lateral projection having a third wedge-shaped surface formed thereon; and
    a lid section on said push-pull rod having a fourth wedge-shaped surface formed thereon and disposed in confrontingly engaging opposition to said third wedge-shaped surface;
    said first and fourth wedge-shaped surfaces being of equal slope and orientation and said second and third wedge-shaped surfaces being of equal slope and orientation;
    said first and said second wedge-shaped surfaces cooperatively moving said cutting blade between said first non-cutting position and said second cutting position as said push-pull rod is one of linearly pushed into and pulled out of said blade drum, said third and said fourth wedge-shaped surfaces cooperatively moving said cutting blade between said second cutting position and said first non-cutting position as said push-pull rod is the other one of linearly pushed into and pulled out of said blade drum.

2. An apparatus in accordance with claim 1, wherein said blade drum recess is substantially U-shaped and defines an axial guide for accommodating linear movement of said push-pull rod axially along the blade drum.

3. An apparatus in accordance with claim 1, further comprising a stationary linear drive comprising a hydraulic cylinder connected to said thrust bearing and operable for providing linear driving forces to said push-pull rod for linearly moving said rod axially along the blade drum.

4. An apparatus in accordance with claim 1 wherein, in said second cutting position of said blade, said first and said second wedge-shaped surfaces do not contact each other and said third and said fourth wedge-shaped surfaces do not contact each other.

\* \* \* \* \*